US012644417B2

(12) United States Patent
Ross et al.

(10) Patent No.: US 12,644,417 B2
(45) Date of Patent: Jun. 2, 2026

(54) FUEL INJECTOR COOLING SYSTEM

(71) Applicant: General Electric Company, Schenectady, NY (US)

(72) Inventors: Steven A. Ross, Wyoming, OH (US); Jeff Scott Laubenthal, Warrendale, PA (US); Donald Craig Stevens, Amelia, OH (US); Eric John Kress, Loveland, OH (US)

(73) Assignee: General Electric Company, Evendale, OH (US)

( * ) Notice: Subject to any disclaimer, the term of this patent is extended or adjusted under 35 U.S.C. 154(b) by 46 days.

(21) Appl. No.: 18/599,505

(22) Filed: Mar. 8, 2024

(65) Prior Publication Data

US 2025/0283432 A1     Sep. 11, 2025

(51) Int. Cl.
| *F02C 7/232* | (2006.01) |
| *F02C 7/18* | (2006.01) |
| *F23R 3/28* | (2006.01) |

(52) U.S. Cl.
CPC ............... *F02C 7/232* (2013.01); *F02C 7/18* (2013.01); *F23R 3/283* (2013.01); *F05D 2240/35* (2013.01); *F05D 2260/232* (2013.01)

(58) Field of Classification Search
CPC ........ F02C 7/232; F02C 7/18; F05D 2240/35; F05D 2260/232; F23R 3/28; F23R 3/283; F23R 3/286; F16K 49/005; Y10T 137/6579
USPC ............... 239/125, 132, 132.1, 132.3, 132.5
See application file for complete search history.

(56) References Cited

U.S. PATENT DOCUMENTS

| 1,323,778 | A | | 12/1919 | Lemp | |
| 2,031,541 | A | | 2/1936 | Macclain | |
| 2,341,682 | A | * | 2/1944 | Andrews | ................... F23D 1/00 |
| | | | | | 239/132.3 |
| 2,970,436 | A | | 2/1961 | Sims, Jr. | |
| 4,365,747 | A | * | 12/1982 | Knapp | ................... F02M 51/08 |
| | | | | | 239/125 |
| 4,409,791 | A | * | 10/1983 | Jourdain | ................. F02C 7/222 |
| | | | | | 60/800 |
| 4,474,001 | A | | 10/1984 | Griffin et al. | |

(Continued)

FOREIGN PATENT DOCUMENTS

| EP | 1884628 A2 | 2/2008 |
| EP | 2442195 A2 | 4/2012 |

(Continued)

*Primary Examiner* — Gerald L Sung
*Assistant Examiner* — Henry Ng
(74) *Attorney, Agent, or Firm* — McCarter & English, LLP

(57) ABSTRACT

A fuel injector cooling system, comprising: a blower including a blower inlet and a blower outlet; a valve including a valve inlet and a valve outlet; a duct defining a flow passage between the blower outlet and the valve inlet; a fuel injector including a flange and a valve housing extending radially outward from the flange, wherein the valve housing defines an outer surface of the fuel injector; and a cooling jacket defining an inner surface and a cooling air inlet in fluid communication with the flow passage, wherein the cooling jacket defines a cooling flow passage between the inner surface of the cooling jacket and the outer surface of the valve housing, wherein the cooling flow passage is in fluid communication with the flow passage.

9 Claims, 9 Drawing Sheets

(56) References Cited

U.S. PATENT DOCUMENTS

| | | | | |
|---|---|---|---|---|
| 4,655,912 | A * | 4/1987 | Bradley | F02C 9/263 |
| | | | | 210/432 |
| 5,012,639 | A | 5/1991 | Ream et al. | |
| 5,104,310 | A * | 4/1992 | Saltin | F23L 7/007 |
| | | | | 431/9 |
| 5,123,242 | A | 6/1992 | Miller | |
| 5,127,222 | A | 7/1992 | Ream et al. | |
| 5,598,696 | A * | 2/1997 | Stotts | F23R 3/283 |
| | | | | 60/800 |
| 6,125,624 | A | 10/2000 | Prociw | |
| 6,134,880 | A | 10/2000 | Yoshinaka | |
| 6,202,403 | B1 | 3/2001 | Laborie | |
| 6,244,034 | B1 | 6/2001 | Taylor et al. | |
| 6,260,776 | B1 * | 7/2001 | Popp | F02M 47/046 |
| | | | | 239/533.6 |
| 6,276,141 | B1 * | 8/2001 | Pelletier | F23D 11/36 |
| | | | | 60/800 |
| 6,305,156 | B1 | 10/2001 | Lui | |
| 6,311,471 | B1 * | 11/2001 | Waldherr | F23R 3/283 |
| | | | | 60/39.55 |
| 7,329,084 | B2 | 2/2008 | Dittmann | |
| 7,766,610 | B2 | 8/2010 | Busekros | |
| 7,823,374 | B2 | 11/2010 | Venkataramani et al. | |
| 7,845,159 | B2 | 12/2010 | Venkataramani et al. | |
| 7,900,437 | B2 | 3/2011 | Venkataramani et al. | |
| 8,015,788 | B2 | 9/2011 | Stephenson et al. | |
| 8,069,827 | B2 | 12/2011 | Watanabe et al. | |
| 8,210,801 | B2 | 7/2012 | Ballard, Jr. et al. | |
| 8,395,275 | B2 | 3/2013 | Blewett et al. | |
| 8,397,487 | B2 | 3/2013 | Sennoun et al. | |
| 8,991,191 | B2 | 3/2015 | Diaz et al. | |
| 9,038,399 | B2 | 5/2015 | MacFarlane | |
| 9,091,171 | B2 | 7/2015 | Rodriguez | |
| 9,260,974 | B2 | 2/2016 | Hasting et al. | |
| 9,874,351 | B2 | 1/2018 | Wolfe | |
| 9,976,484 | B2 | 5/2018 | Sawyers-Abbott | |
| 10,006,636 | B2 | 6/2018 | Ginessin et al. | |
| 10,036,329 | B2 | 7/2018 | Suciu | |
| 10,066,551 | B2 | 9/2018 | Verseux | |
| 10,337,405 | B2 | 7/2019 | Steen et al. | |
| 10,443,622 | B2 | 10/2019 | Rasmussen | |
| 10,563,590 | B2 | 2/2020 | Coldwate et al. | |
| 10,583,933 | B2 | 3/2020 | Elbibary et al. | |
| 11,047,306 | B1 | 6/2021 | Millhaem et al. | |
| 11,555,450 | B1 * | 1/2023 | Ryon | F02C 7/141 |
| 2004/0237530 | A1 * | 12/2004 | Brown | F23R 3/60 |
| | | | | 60/740 |
| 2006/0016192 | A1 * | 1/2006 | Bunel | F23R 3/283 |
| | | | | 60/761 |
| 2006/0080950 | A1 | 4/2006 | Czachor | |
| 2006/0174628 | A1 | 8/2006 | Mikhail | |
| 2008/0238202 | A1 | 10/2008 | Kem | |
| 2009/0175718 | A1 | 7/2009 | Diaz et al. | |
| 2009/0297342 | A1 | 12/2009 | Laborie | |
| 2010/0071667 | A1 * | 3/2010 | Hicks | F23R 3/283 |
| | | | | 123/470 |
| 2010/0236502 | A1 | 9/2010 | Watanabe et al. | |
| 2011/0100015 | A1 | 5/2011 | Alagappan et al. | |
| 2011/0120075 | A1 | 5/2011 | Diaz et al. | |
| 2012/0074243 | A1 * | 3/2012 | Prociw | F01N 3/36 |
| | | | | 239/533.2 |
| 2013/0091850 | A1 | 4/2013 | Francisco | |
| 2013/0098047 | A1 | 4/2013 | Suciu | |
| 2013/0227960 | A1 | 9/2013 | Bonner | |
| 2013/0228647 | A1 | 9/2013 | Bystry, Jr. | |
| 2013/0283762 | A1 | 10/2013 | Simpson et al. | |
| 2013/0319016 | A1 | 12/2013 | Fontanel et al. | |
| 2013/0341430 | A1 * | 12/2013 | Hall | F02M 61/167 |
| | | | | 239/533.2 |
| 2014/0077116 | A1 | 3/2014 | Walker Santiago et al. | |
| 2014/0077507 | A1 | 3/2014 | Barnett | |
| 2014/0083106 | A1 | 3/2014 | Mackin et al. | |
| 2014/0318759 | A1 | 10/2014 | Ellis et al. | |
| 2014/0333127 | A1 | 11/2014 | Edwards | |
| 2015/0247462 | A1 | 9/2015 | Suciu | |
| 2015/0252683 | A1 | 9/2015 | Hasting et al. | |
| 2015/0267616 | A1 | 9/2015 | Verseux | |
| 2015/0292743 | A1 * | 10/2015 | Mook | F02C 7/18 |
| | | | | 29/889.22 |
| 2015/0330310 | A1 | 11/2015 | deGaribody | |
| 2016/0003094 | A1 * | 1/2016 | Renggli | C04B 35/565 |
| | | | | 415/200 |
| 2016/0053650 | A1 * | 2/2016 | Seitz | F16K 31/0655 |
| | | | | 137/340 |
| 2016/0123185 | A1 | 5/2016 | Le Pache et al. | |
| 2016/0201917 | A1 * | 7/2016 | Dautova | F23R 3/20 |
| | | | | 60/785 |
| 2016/0230677 | A1 | 8/2016 | Feulner | |
| 2016/0230998 | A1 * | 8/2016 | Frish | F23R 3/283 |
| 2016/0273453 | A1 * | 9/2016 | Frish | F23R 3/283 |
| 2016/0332743 | A1 | 11/2016 | Teicholz | |
| 2017/0122564 | A1 * | 5/2017 | Cadman | F23R 3/283 |
| 2017/0138266 | A1 * | 5/2017 | Caples | F23R 3/283 |
| 2017/0184025 | A1 | 6/2017 | Sawyers-Abbott | |
| 2017/0191419 | A1 | 7/2017 | Bayraktar et al. | |
| 2017/0234224 | A1 | 8/2017 | Adibhatla | |
| 2017/0342855 | A1 | 11/2017 | Hon | |
| 2017/0363004 | A1 * | 12/2017 | Xu | F23R 3/346 |
| 2017/0370291 | A1 | 12/2017 | Rambo | |
| 2018/0016933 | A1 | 1/2018 | Elbibary et al. | |
| 2018/0128178 | A1 | 5/2018 | Snape | |
| 2018/0149086 | A1 | 5/2018 | Moniz et al. | |
| 2018/0149093 | A1 | 5/2018 | Moniz et al. | |
| 2019/0153952 | A1 | 5/2019 | Niergarth et al. | |
| 2020/0150699 | A1 | 5/2020 | Marotta et al. | |
| 2020/0217509 | A1 * | 7/2020 | Lakshmanan | F23R 3/283 |
| 2021/0301677 | A1 | 9/2021 | Tomescu | |
| 2022/0235706 | A1 | 7/2022 | Millhaem et al. | |
| 2023/0175696 | A1 * | 6/2023 | Peterson | F23R 3/36 |
| | | | | 60/776 |

FOREIGN PATENT DOCUMENTS

| | | | |
|---|---|---|---|
| FR | 2955896 | A1 | 8/2011 |
| FR | 2955897 | A1 | 8/2011 |
| JP | 2004308616 | A | 11/2004 |
| JP | 2007262901 | A | 10/2007 |

\* cited by examiner

FUEL INJECTOR COOLING SYSTEM

FIELD

The present disclosure relates to gas turbine engines. More particularly, this disclosure is directed to fuel injector cooling systems for a gas turbine engine.

BACKGROUND

A gas turbine engine generally includes a fuel system including various valves which provide a supply of hydrocarbon fuel (liquid or gas) to fuel injectors of a combustor during operation. When the gas turbine engine is shut down, engine cooling systems may also shut down, resulting in thermal soakback where residual heat in certain engine components is transferred to other components such as the fuel valves as the engine cools. As the fuel valves heat up, carbon deposits or "coke" may form in the fuel valves.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
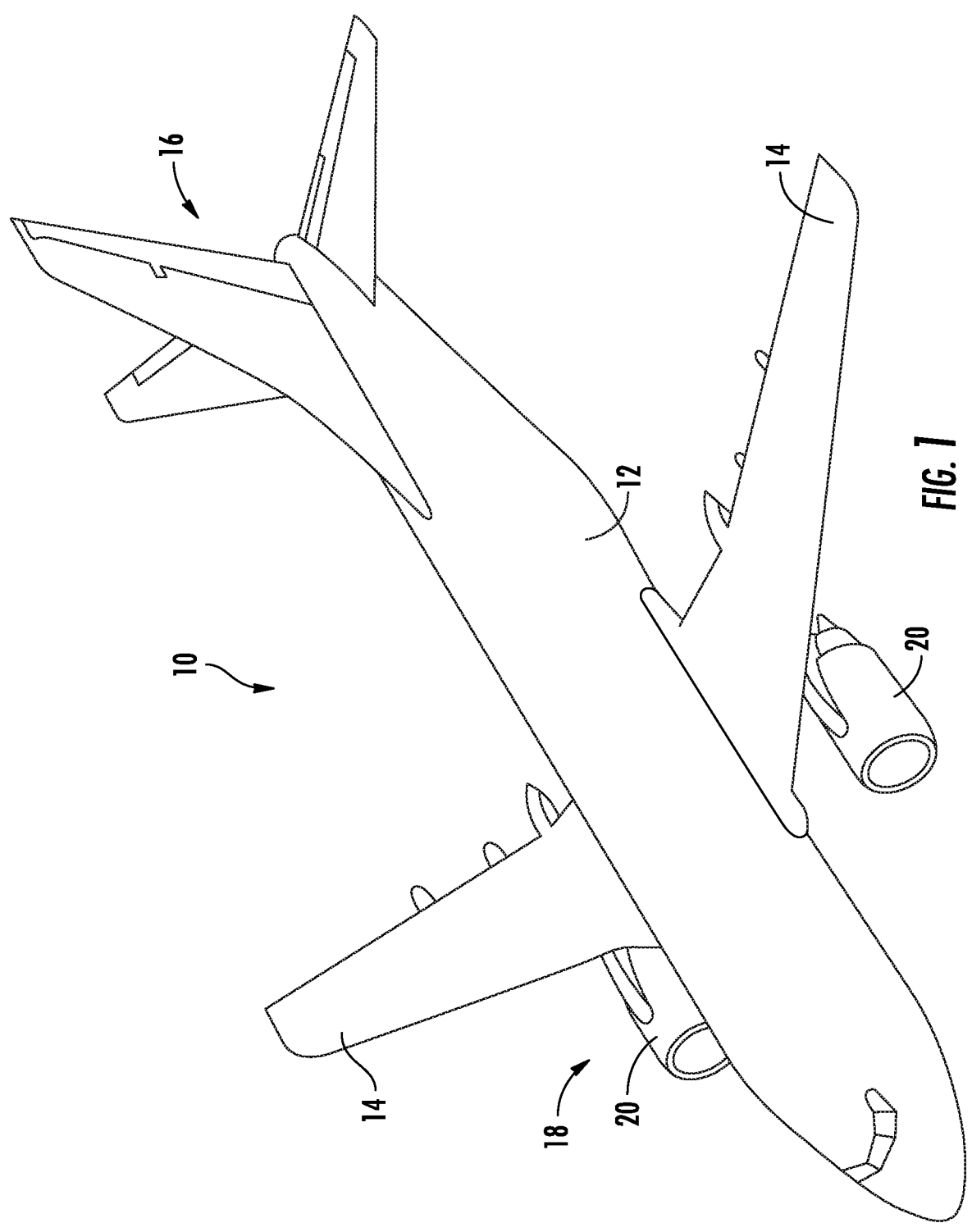
FIG. 1 is a perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, regarding a gas turbine engine, forward refers to a position closer to an engine inlet section and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The present disclosure is generally related to a fuel injector cooling system for a fuel injector of a gas turbine engine. More specifically, the disclosure is directed to a cooling system including a blower, a valve downstream from the blower, a duct defining a flow passage between the blower and the valve, a fuel injector including a flange and a valve housing extending radially outward from the flange. The fuel injector cooling system further includes a cooling jacket that at least partially surrounds the valve housing and defines a cooling flow passage between an inner surface of the cooling jacket and an outer surface of the valve housing. In alternate embodiments, the cooling jacket or more particularly, the cooling passage, may be integrally formed, such as via additive manufacturing or other known manufacturing processes, with the valve housing.

During normal operations of a gas turbine engine, temperatures of the various engine components are maintained within allowable limits by a plurality of cooling systems that transfer heat from the various engine components to one or more heat sinks. When the engine is shutdown, most cooling systems no longer operate. Residual heat in certain engine components (e.g. "soakback") can increase the temperature of other engine components beyond allowable limits. A particular concern is the formation of carbon (or "coke") deposits in fuel carrying components, particularly a fuel injector, when a hydrocarbon fuel (liquid or gas) is exposed to high temperatures in the presence of oxygen.

Referring now to the drawings, wherein identical numerals indicate the same elements throughout the figures, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both.

The propulsion system 18 includes at least one turbomachine. In the exemplary embodiment shown, aircraft 10 includes a pair of gas turbine engines. Each gas turbine engine 20 is mounted to aircraft 10 in an under-wing configuration. Each gas turbine engine 20 is capable of selectively generating propulsive thrust for the aircraft 10. The gas turbine engine 20 may be configured to burn various forms of fuel including, but not limited to unless otherwise provided, jet fuel/aviation turbine fuel, and hydrogen fuel.

Figure 2:
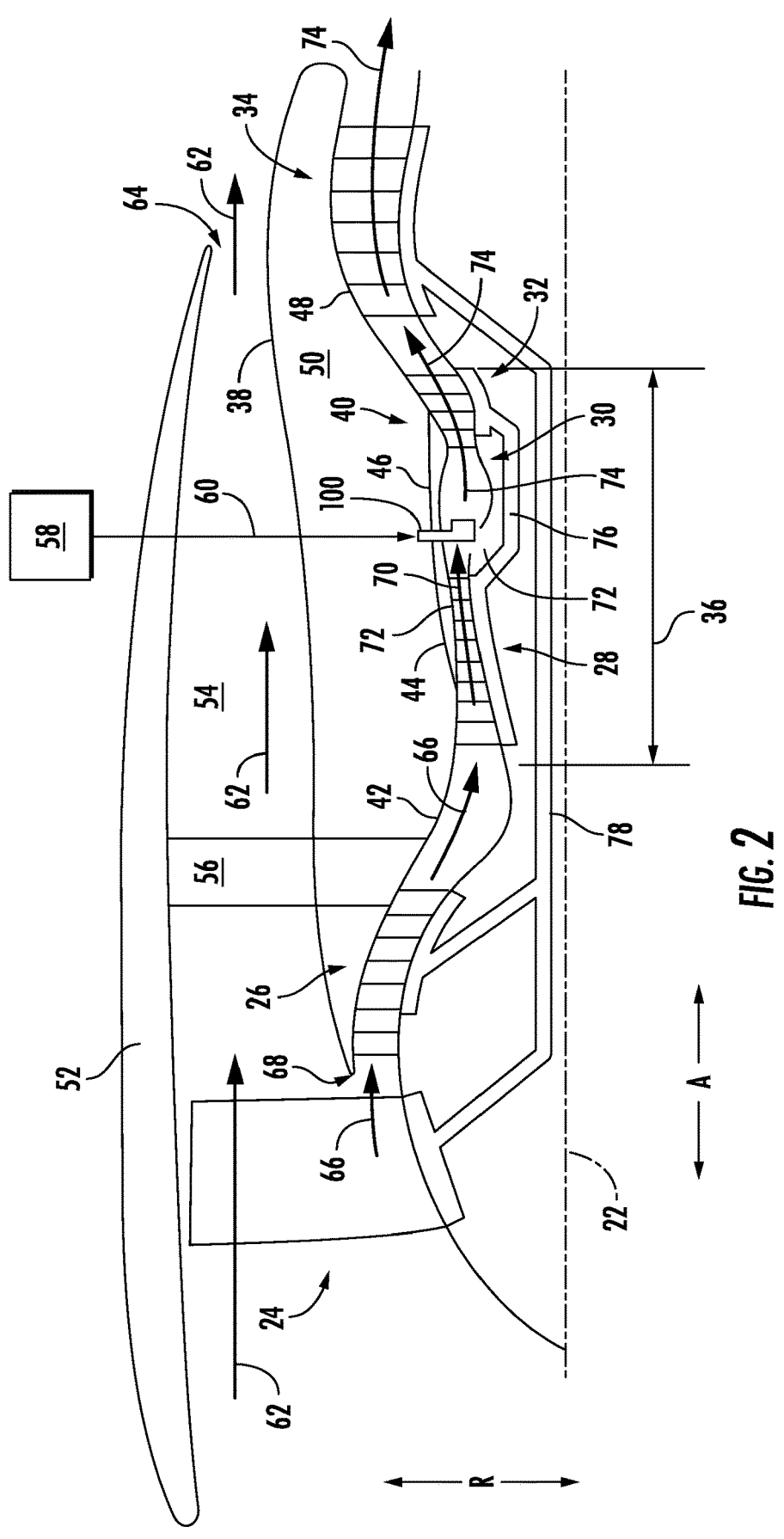
FIG. 2 is a cross-sectional schematic view of a gas turbine engine in accordance with an exemplary aspect of the present disclosure.

FIG. 2 depicts an exemplary gas turbine engine 20 defining an axial direction A (and centerline axis 22) and a radial direction R. While the illustrated example shown is a high-bypass turbofan engine, the principles of the present disclosure are also applicable to other types of engines, such as low-bypass turbofans, turbojets, turboprops, unducted fan engines or open rotor engines, etc., as well as turbine engines having any number of compressor-turbine spools.

The gas turbine engine 20 includes a fan 24, a low-pressure compressor 26 or "booster", a high-pressure compressor 28, a combustion section or combustor 30, a high-pressure turbine 32, and a low-pressure turbine 34, arranged in serial flow relationship. Collectively, the fan 24, the low-pressure compressor 26, and the low-pressure turbine 34 define a low-pressure system or low-pressure spool of the gas turbine engine 20. Collectively, the high-pressure compressor 28 and the high-pressure turbine 32 define a high-pressure spool of the gas turbine engine 20.

The high-pressure spool and combustor 30 may be referred to as a core engine 36 of the gas turbine engine 20. The core engine 36 is at least partially enclosed within a core cowl 38. The core cowl 38 may also at least partially enclose the low-pressure compressor 26 and the low-pressure turbine 34. An engine casing 40 encases the core engine 36. The engine casing 40 may include one or more of a compressor casing 42, a compressor discharge casing 44, a combustor casing 46, and a turbine casing 48. In exemplary embodiments, an under-cowl space 50 is defined between the engine casing 40 and the core cowl 38. Various engine components may be positioned or stored within the under-cowl space 50.

In particular configurations, a nacelle 52 surrounds at least a portion of the core engine 36, the core cowl 38, and the fan 24. The nacelle 52 and the core cowl 38 form a bypass flow passage 54 therebetween. The nacelle 52 may be supported by one or more struts 56 that extend radially outward from an engine frame (not shown) to the nacelle 52. A plurality of fuel injectors (one fuel injector 100 shown) is mounted to the engine casing 40, more particularly, to the combustor casing 46, and includes a portion that extends radially inward from the combustor casing 46 into the combustor 30. A fuel supply system 58 is fluidly coupled to and in fluid communication with the fuel injector 100 to provide a flow of a fuel 60 such as a hydrocarbon fuel to the fuel injector 100.

Figure 3:
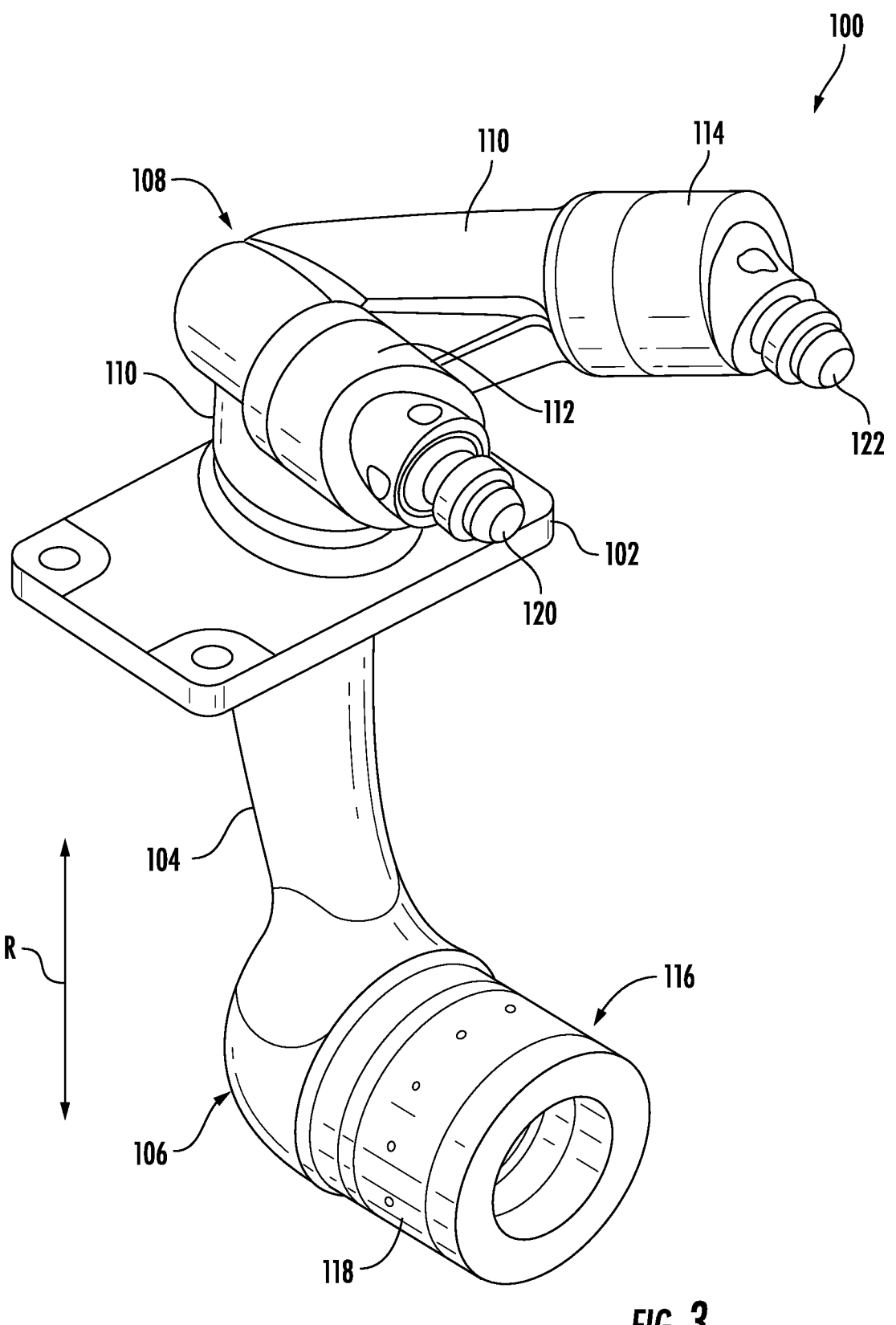
FIG. 3 is a perspective view of an exemplary fuel injector according to an exemplary embodiment of the present disclosure.

FIG. 3 provides a perspective view of an exemplary fuel injector 100 as may be incorporated into the gas turbine engine 20, according to exemplary embodiments of the present disclosure. As shown in FIG. 3, the fuel injector 100 may include a flange 102 adapted to be fixed and sealed to the combustor casing 46 (FIG. 2). A hollow stem 104 extends inwardly with respect to radial direction R from the flange 102 and includes an inlet fairing 106 surrounding an annular pilot inlet (not shown) of the fuel injector 100. In particular embodiments, the hollow stem 104 is integral and integrally formed with the inlet fairing 106. In particular embodiments, the hollow stem 104 of the fuel injector 100 may be integral with (as illustrated herein) or fixed to the flange 102 (such as by brazing or welding).

As shown in FIG. 3, the fuel injector 100 includes a valve housing 108 defining an outer surface 110. The valve housing 108 extends radially outward from the flange 102 with respect to radial direction R. The valve housing 108 may be configured or formed to receive one or more fuel valves. For example, as shown in FIG. 3, the valve housing 108 may be configured to receive a first fuel valve 112 and a second fuel valve 114. In particular embodiments, the first fuel valve 112 may be configured as a pilot-fuel fuel valve and the second fuel valve 114 may be configured as a main-fuel fuel valve or vice versa. As shown in FIG. 3, the hollow stem 104 and the inlet fairing 106 support a nozzle tip 116 including a nozzle body 118. The first fuel valve 112 and the second fuel valve 114 are fluidly connected to and in fluid communication with fuel supply system 58 (FIG. 2) via a first fuel inlet 120 of the first fuel valve 112 and a second fuel inlet 122 of the second fuel valve 114. The nozzle body 118 is illustrated as having a dual-orifice pilot fuel and primary fuel injector tip configured to deliver both a flow of fuel for start-up operations and a primary flow of fuel for various ground, and in-flight operating conditions.

Referring now to FIG. 2, in operation, fan 24 draws a first portion of air 62 into the bypass flow passage 54. The first portion of air 62 is routed through the bypass flow passage 54 and out a bypass exhaust outlet 64 to provide primary thrust for the gas turbine engine 20. A second portion of air 66 from fan 24 is drawn or routed into an inlet 68 of the low-pressure compressor 26 and is pressurized. The second portion of air 66 is further pressurized as it flows from the low-pressure compressor 26 and through the high-pressure compressor 28 to provide a high-pressure air 70 to a compressor discharge plenum 72 at least partially defined by the engine casing 40.

The high-pressure air 70 flows from the compressor discharge plenum 72 into the combustor 30 where it is mixed with fuel 60 via fuel injector 100 and ignited, thereby generating combustion gases 74. Work is extracted from the combustion gases 74 by the high-pressure turbine 32 which drives the high-pressure compressor 28 via a high-pressure shaft 76. Combustion gases 74 then flow into the low-pressure turbine 34, which drives the fan 24 and the low-pressure compressor 26 via a low-pressure shaft 78.

As used herein, the gas turbine engine 20 is considered to be "operating" when fuel is being supplied to the fuel injectors 100, burned in the combustor 30, and the resulting combustion gases 74 are driving rotation of at least the core engine 36. As used herein, gas turbine engine 20 is considered to be "shut down" when the fuel supply is shut off and is not being supplied to the combustor 30. It will be understood that "operating" encompasses numerous operating conditions having varying rotor or shaft speeds and varying thrust and/or power outputs. It is also to be understood that parts of the engine might still be moving/slowing down, even though the engine is considered to be "shut down".

During normal operations, temperatures of gas turbine engine components are maintained within allowable limits by a plurality of cooling systems that transfer heat from the various components to one or more heat sinks. When the engine is shutdown, most cooling systems no longer operate. Residual heat in certain engine components (e.g. "soakback") can increase the temperature of other engine components beyond allowable limits. A particular concern is the formation of carbon (or "coke") deposits in fuel carrying components, particularly a fuel injector, when a hydrocarbon fuel (liquid or gas) is exposed to high temperatures in the presence of oxygen.

Figure 4:
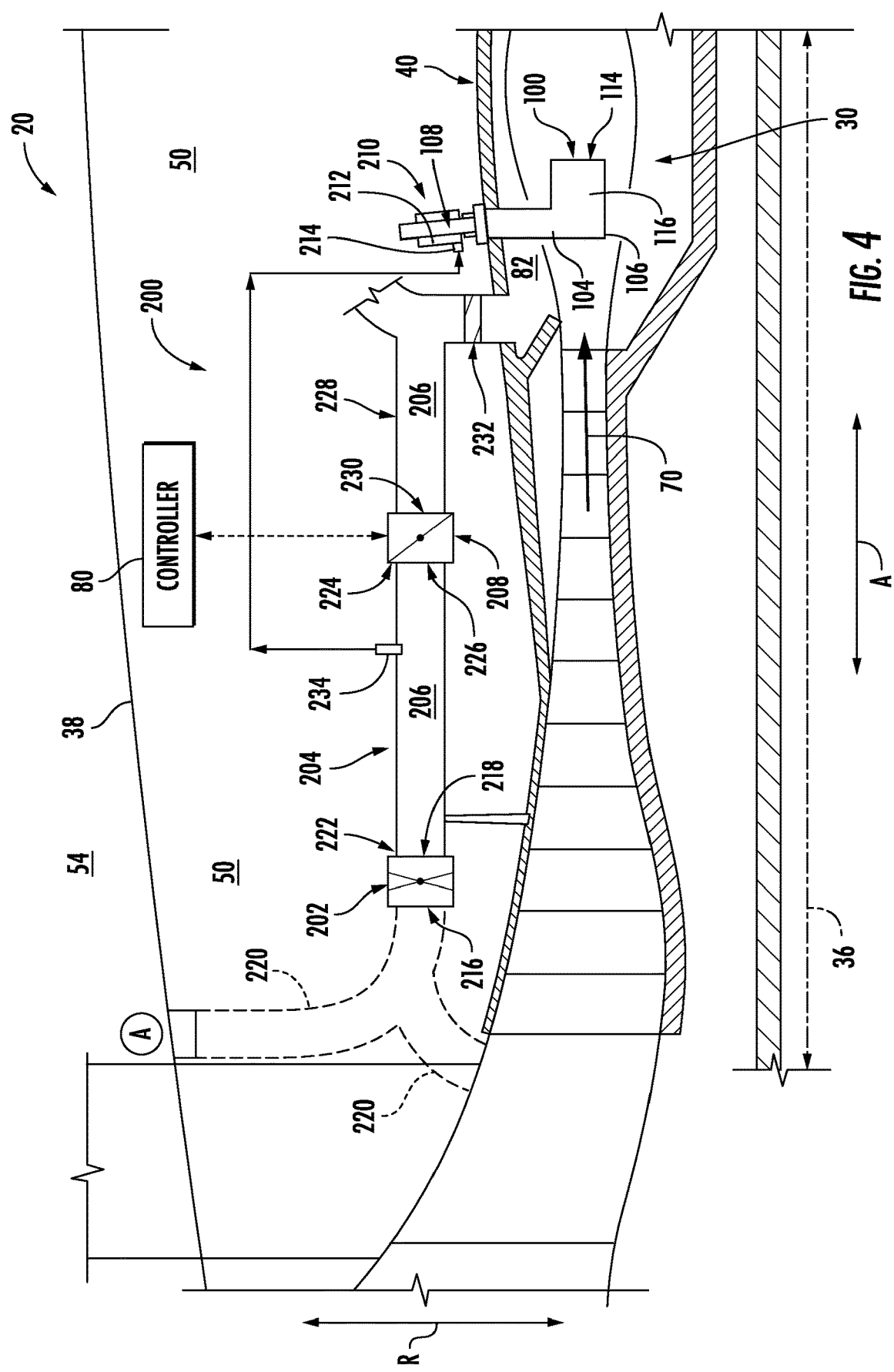
FIG. 4 is an enlarged cross-sectional schematic view of a portion of the gas turbine engine as shown in FIG. 2, including a portion of a core engine and a fuel injector cooling system according to exemplary embodiments of the present disclosure.

FIG. 4 provides an enlarged schematic view of a portion of the gas turbine engine 20 including a portion of the core engine 36 as shown in FIG. 2, and a fuel injector cooling system 200 according to exemplary embodiments of the present disclosure. The fuel injector cooling system 200 generally includes, in serial flow order, a blower 202, a duct 204 fluidly connected to the blower 202 and at least partially defining a flow passage 206 downstream from the blower 202, a valve 208, and a cooling jacket 210 including an inner surface 212 and a cooling air inlet 214 in fluid communication with the flow passage 206. The fuel injector cooling system 200 may be at least partially or fully enclosed within the under-cowl space 50 formed between the engine casing 40 and the core cowl 38.

Duct 204 may be formed from one or more pipes, conduits, or the like, coupled together to, at least partially, define flow passage 206. In particular embodiments, valve 208 may be a passive valve such as a butterfly valve. In other embodiments, valve 208 may be an actuator-controlled valve, such as but not limited to a butterfly valve, which is moveable between a fully open and a fully closed position via one or more of electrical, hydraulic, or pneumatic inputs provided by a controller 80. Controller 80 may be a standalone controller, a gas turbine engine controller (e.g., a full authority digital engine control, or FADEC, controller), an aircraft controller, supervisory controller for a propulsion system, a combination thereof, etc.

Blower 202 includes a blower inlet 216 and a blower outlet 218. In exemplary embodiments, blower inlet 216 may be in fluid communication with the under-cowl space 50 defined between the core cowl 38 and the engine casing 40. In addition, or in the alternative, the blower inlet 216 may be in fluid communication with the low-pressure compressor 26, the high-pressure compressor 28, or with ambient air (A) from outside of the under-cowl space 50, such as but not limited to the bypass flow passage 54, via various blower inlet ducts 220 as shown in dashed lines. In an exemplary embodiment, blower 202 is electrically powered.

In exemplary embodiments, duct 204 includes an upstream end 222 that is fluidly coupled to and in fluid communication with the blower outlet 218, and a downstream end 224 that is fluidly coupled to and in fluid communication with the valve 208 via a valve inlet 226. In particular embodiments, a second duct 228 is fluidly coupled to and in fluid communication with a valve outlet 230 of valve 208. The second duct 228 may be formed from one or more pipes, conduits, or the like, coupled together to further define the flow passage 206 downstream from the valve outlet 230.

The second duct 228 may be fluidly connected to and in fluid communication with a cooling air plenum 82 at least partially defined within the engine casing 40 and disposed downstream from valve outlet 230. The cooling air plenum 82 may be in fluid communication with the combustor 30 for providing cooling air to portions of the fuel injector 100 disposed within the engine casing 40 and the combustor 30, particularly the hollow stem 104, the inlet fairing 106, the nozzle tip 116, and the fuel nozzle body 118, during shut down of the gas turbine engine 20 to prevent or reduce the formation of coke within those portions of the fuel injector 100. In exemplary embodiments, a check valve 232 may be positioned within the second duct 228 upstream from the cooling air plenum 82. Check valve 232 may be configured to prevent backflow of the high-pressure air 70 into the second duct 228 when the gas turbine engine 20 is operating.

In exemplary embodiments, the cooling air inlet 214 of the cooling jacket 210 is in fluid communication with the flow passage 206 via an air extraction port 234 disposed along and in fluid communication with the duct 204. In particular embodiments, the air extraction port 234 is disposed and fluidly coupled to the flow passage 206 between the blower outlet 218 and the valve inlet 226.

Figure 5:
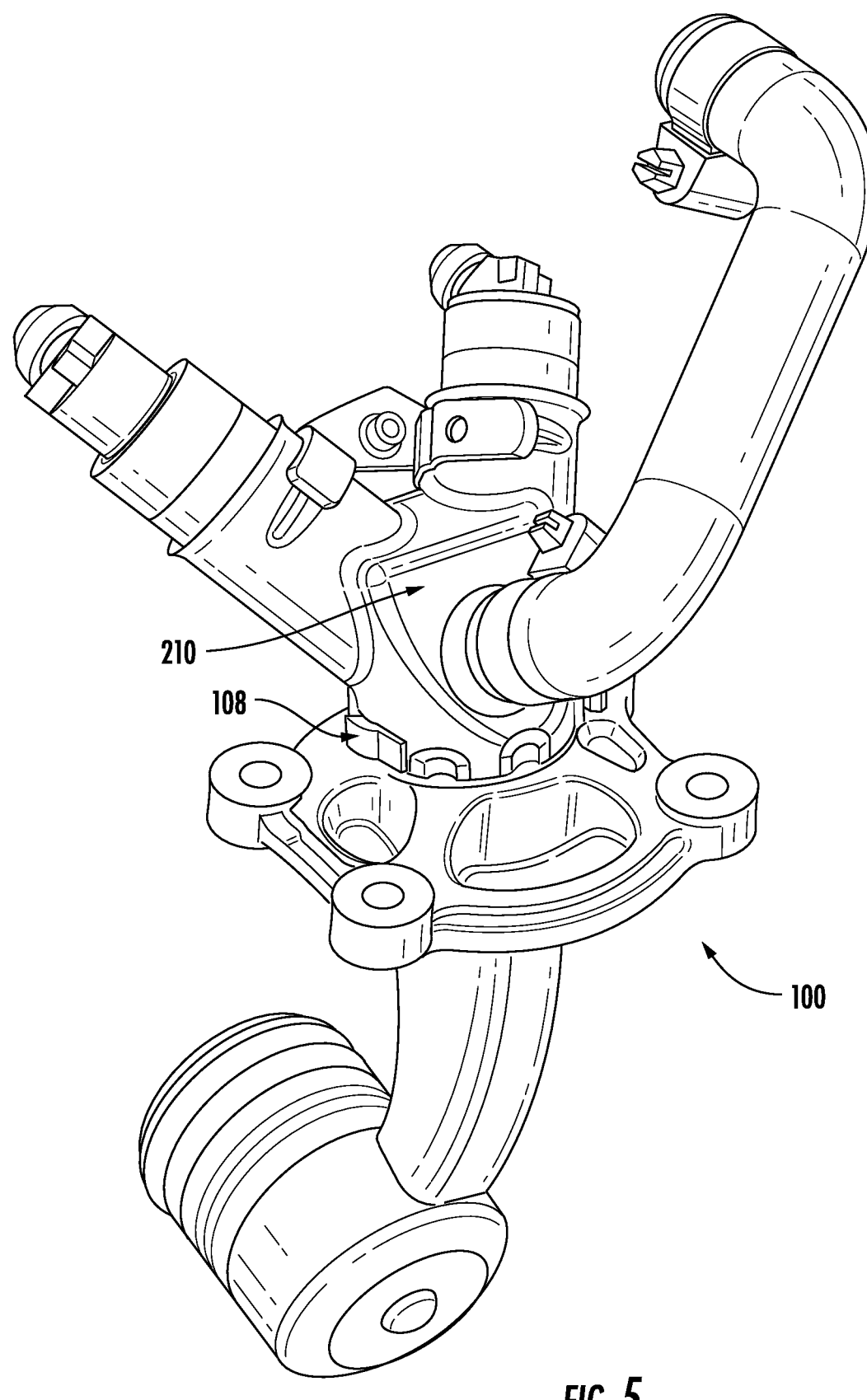
FIG. 5 is a perspective view of an exemplary fuel injector including a cooling jacket surrounding a valve housing of the fuel injector according to an exemplary embodiment of the present disclosure.
Figure 6:
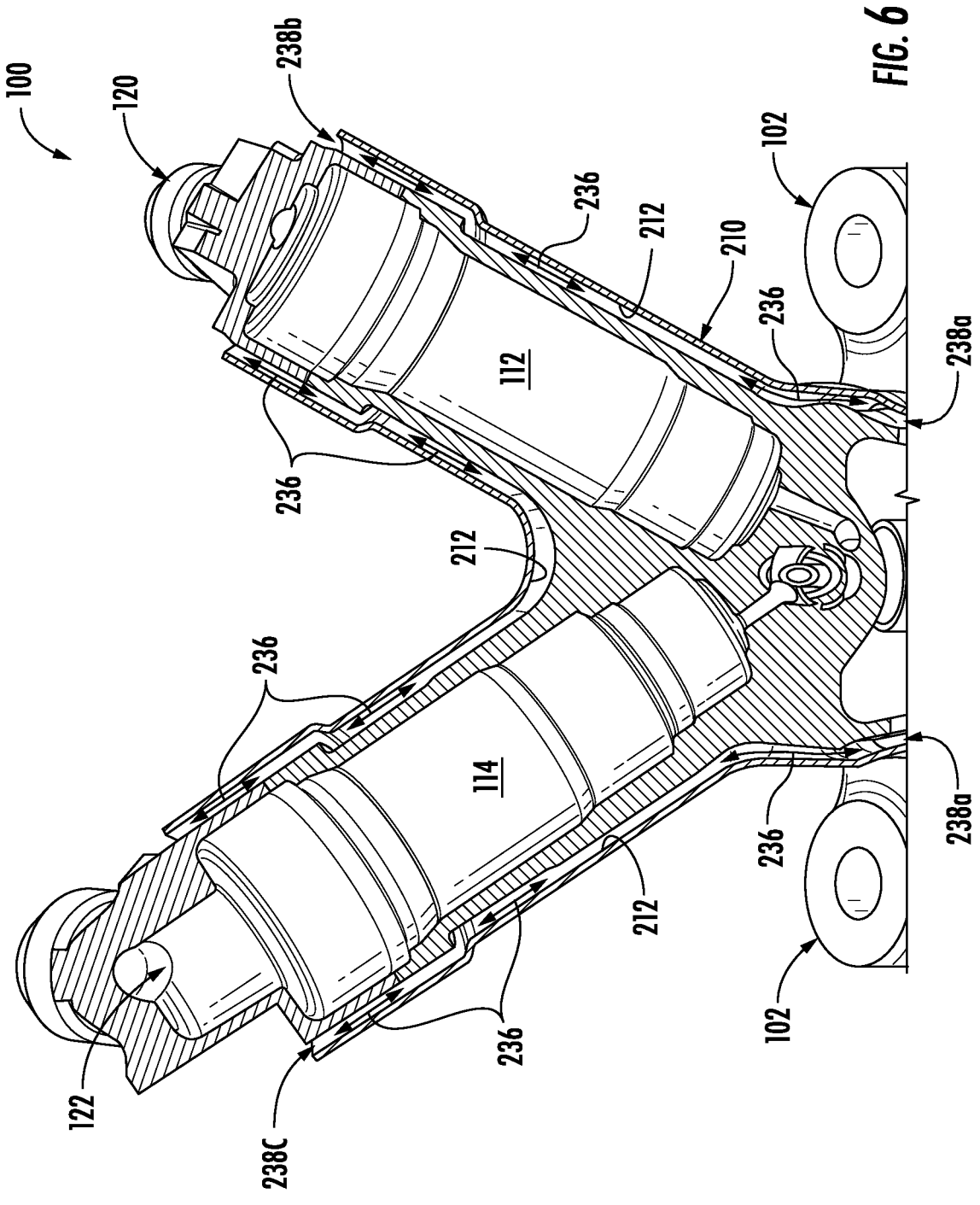
FIG. 6 is a cutaway view of a top portion of the fuel injector shown in FIG. 5 including the cooling jacket, according to exemplary embodiments of the present disclosure.
Figure 7:
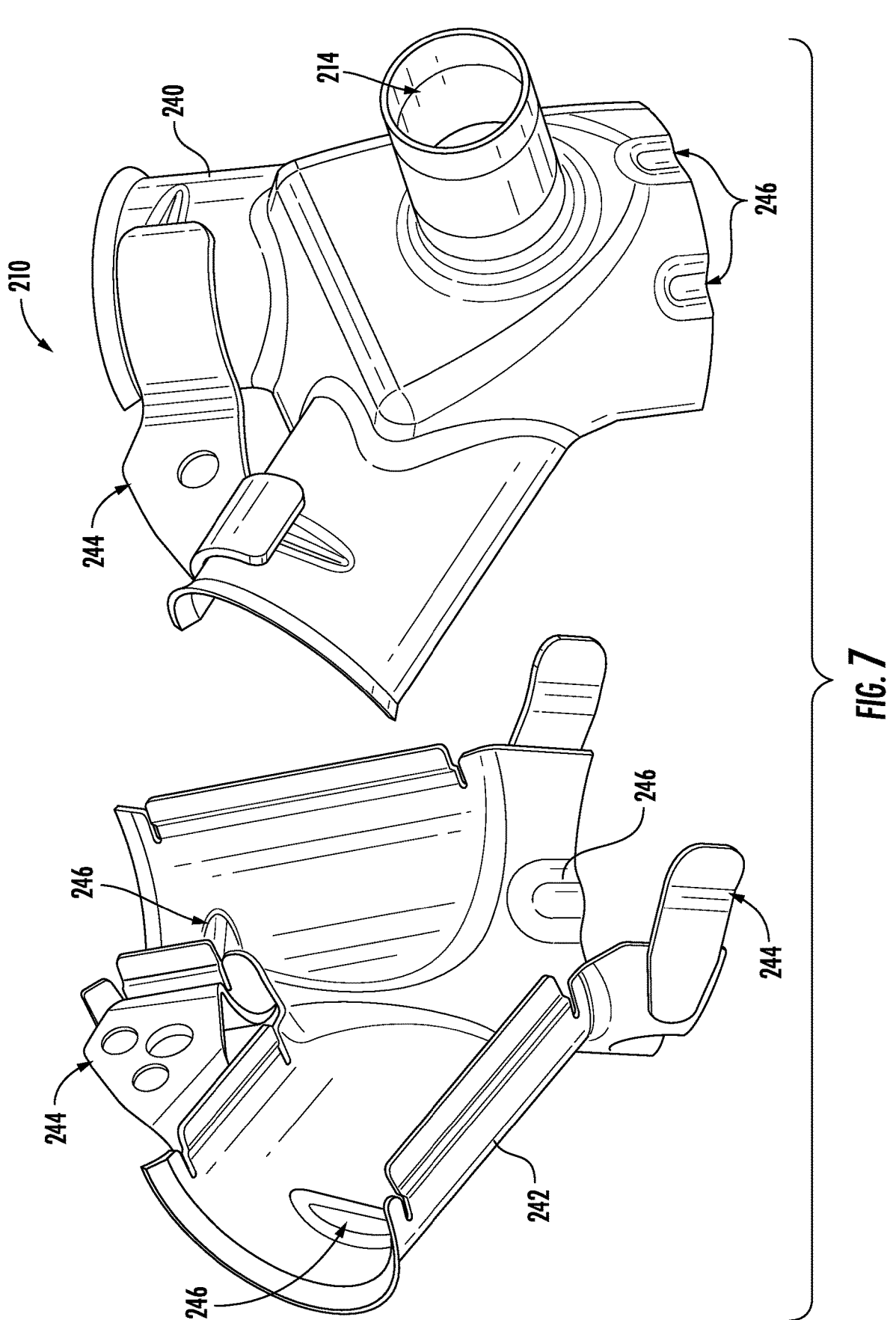
FIG. 7 is an exploded perspective view of an exemplary cooling jacket according to exemplary embodiments of the present disclosure.

FIG. 5 provides a perspective aft facing view of the fuel injector 100 including the cooling jacket 210 surrounding at least a portion of the valve housing 108 according to exemplary embodiments of the present disclosure. FIG. 6 provides a cutaway view of a top portion of the fuel injector 100 including the cooling jacket 210, according to exemplary embodiments of the present disclosure. As shown in FIGS. 6 and 7 collectively, the cooling jacket 210 is formed or shaped to extend at least partially around at least a portion of the valve housing 108 of the fuel injector 100.

As illustrated in FIG. 6, the inner surface 212 of the cooling jacket 210 is offset from the outer surface 110 of the valve housing 108 to form a cooling flow passage 236 between the inner surface 212 of the cooling jacket 210 and the outer surface 110 of the valve housing 108. The cooling jacket 210 defines at least one cooling flow outlet 238(a-c). For example, in exemplary embodiments, a first cooling flow outlet 238(a) is formed proximate to the flange 102. A second cooling flow outlet 238(b) may be formed proximate to the first fuel inlet 120 of the first fuel valve 112. In addition, or in the alternative, a third cooling flow outlet 238(c) may be formed proximate to the second fuel inlet 122 of the second fuel valve 114. The first fuel inlet 120 and the second fuel inlet 122 are fluidly connected to and in fluid communication with the fuel supply system 58 (FIG. 2).

Figure 8:
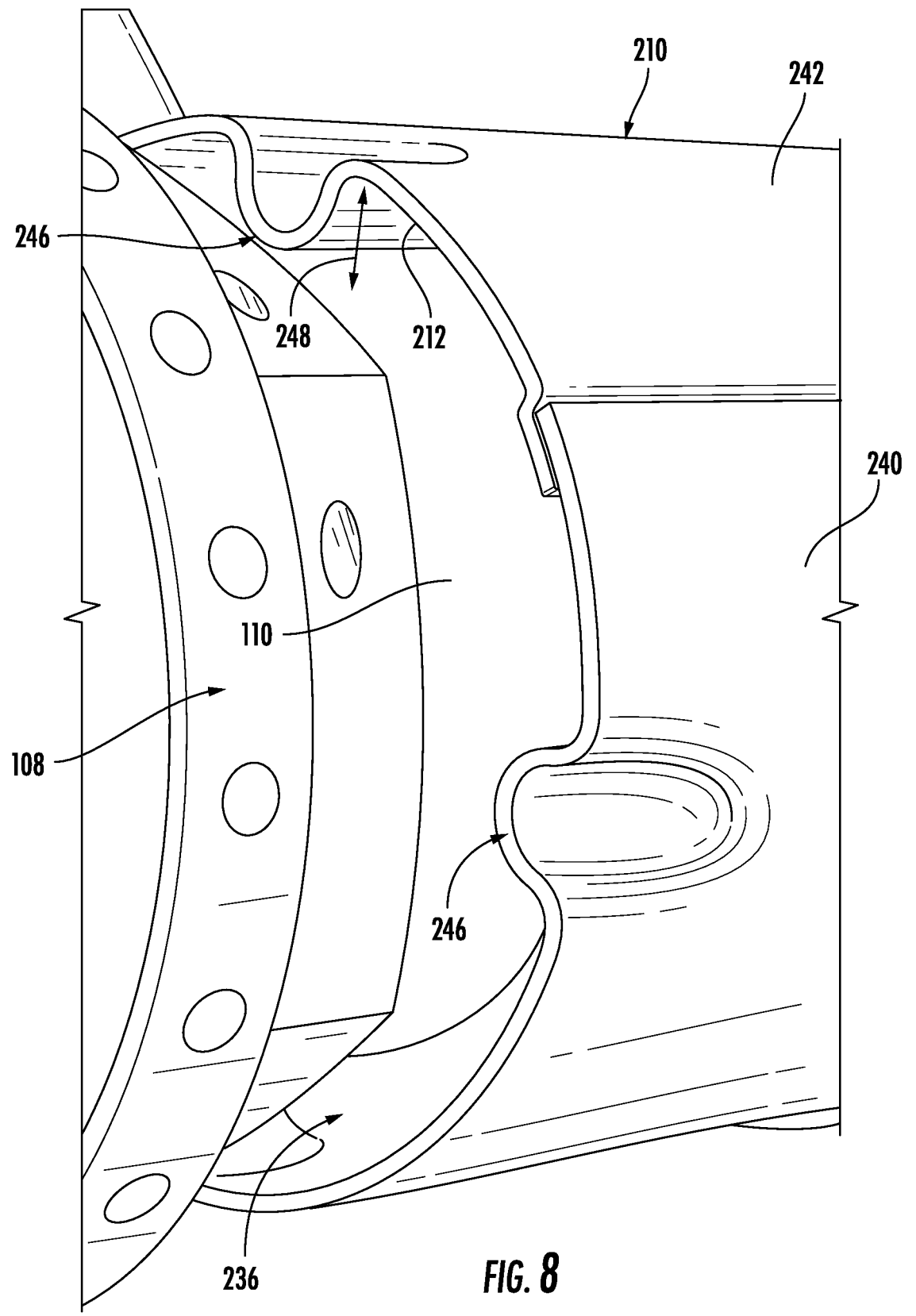
FIG. 8 is an enlarged view of a portion of the cooling jacket and the fuel injector as shown in FIG. 5, according to exemplary embodiments of the present disclosure.

FIG. 7 provides an exploded perspective view of the cooling jacket 210 according to exemplary embodiments of the present disclosure. FIG. 8 provides an enlarged view of a portion of the cooling jacket 210 and the valve housing 108 at a respective cooling flow outlet 238 according to exemplary embodiments of the present disclosure. As shown in FIG. 7, the cooling jacket may be formed from two or more shell bodies. For example, in the embodiment shown in FIG. 7, the cooling jacket includes a first shell body 240 and a second shell body 242. The first shell body 240 and the second shell body 242 may be clamped together in a "clam shell" or other configuration to seal the mating shell bodies. It is to be appreciated that although the cooling air inlet 214 is shown on the first shell body 240, it may, in the alternative, be formed on the second shell body 242. One or more mechanical fasteners 244 such as one or more clamps may be used to mechanically fix the first shell body 240 to the second shell body 242. In addition, or in the alternative, the mechanical fastener 244 may include a bolt (not shown) to secure the first shell body 240 to the second shell body 242. In other embodiments, the first shell body 240 and the second shell body 242 may be welded or otherwise joined together. It is to be appreciated that, in alternate embodiments, the cooling jacket 210, or more particularly, the cooling flow passage 236, may be integrally formed, such as via additive manufacturing or other known manufacturing processes, with the valve housing 108.

In exemplary embodiments, as shown in FIG. 8, a plurality of spacers 246 are disposed between the outer surface 110 of the valve housing 108 and the cooling jacket 210 to provide a gap 248 between the outer surface 110 and the inner surface 212, thus at least partially forming the cooling flow passage 236 therebetween. As shown in FIGS. 7 and 8 collectively, the plurality of spacers 246 may be at least partially or fully defined by the first shell body 240 and the second shell body 242 of the cooling jacket 210.

Figure 9:
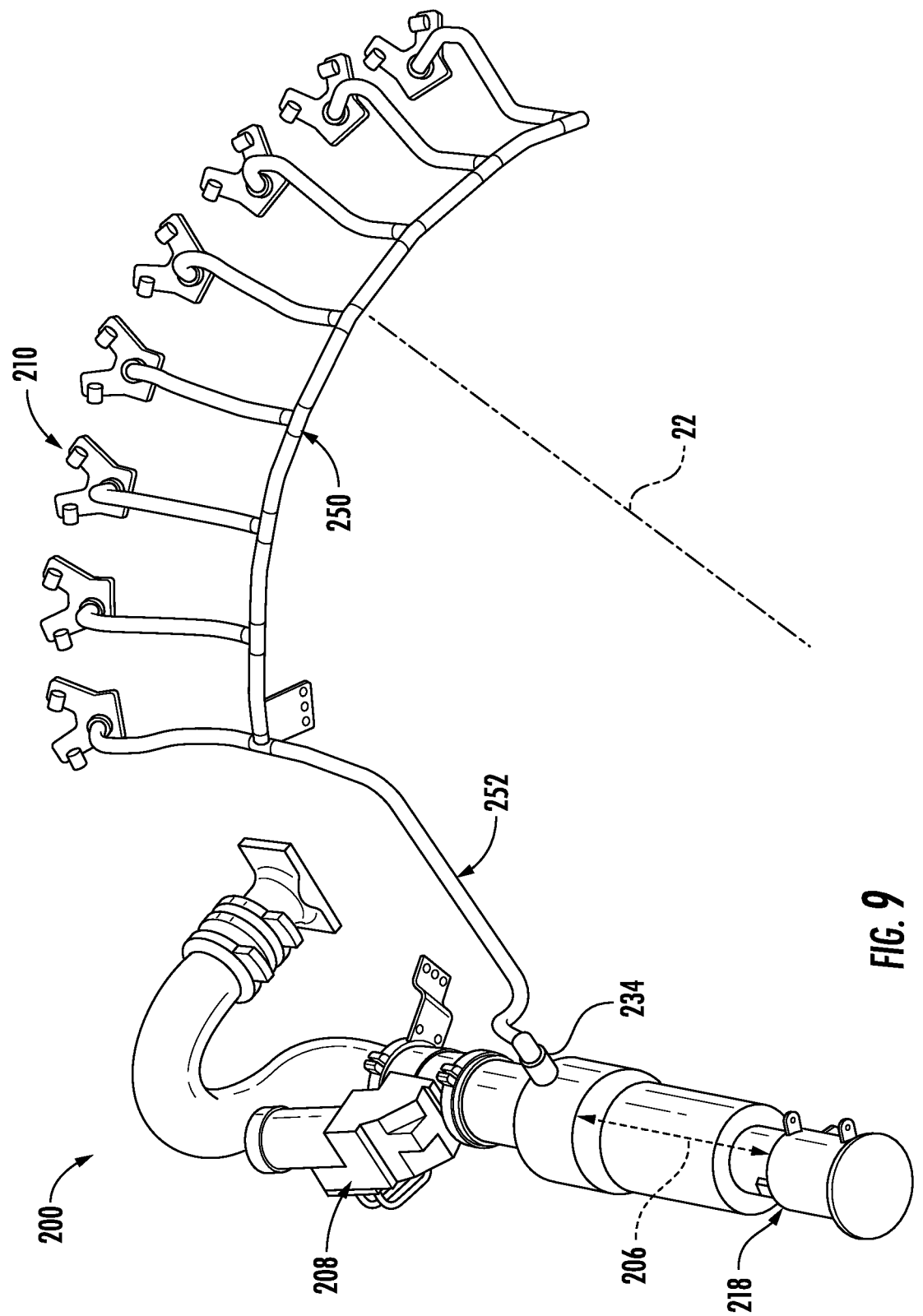
FIG. 9 is a perspective view of a portion of the fuel injector cooling system as shown in FIG. 4, according to an exemplary embodiment of the present disclosure.

FIG. 9 provides a perspective view of a portion of the fuel injector cooling system 200 according to an exemplary embodiment of the present disclosure. As shown in FIG. 9, the fuel injector cooling system 200 may include a plurality of cooling jackets 210 with each cooling jacket 210 surrounding a respective valve housing 108 of a respective fuel injector 100 (not shown). Each cooling jacket 210 is fluidly coupled to and in fluid communication with a ring manifold 250. Ring manifold 250 is fluidly connected to and in fluid communication with the flow passage 206 via one or more fluid couplings such as pipes or conduits 252. Ring manifold 250 extends circumferentially about the centerline axis 22 and around the engine casing 40 (FIG. 4). In exemplary embodiments, as shown in FIG. 9, ring manifold 250 is in fluid communication with the flow passage 206 via the air extraction port 234 downstream from the blower outlet 218 and upstream from the valve 208.

Referring to FIGS. 4-9 collectively, in operation, blower 202 of the fuel injector cooling system 200 is switched on when the gas turbine engine 20 is shutdown, or in anticipation of a shutdown, or in certain instances where a cooling system normally used to cool the fuel injector(s) 100 may be compromised. Blower 202 draws air from one or more of the under-cowl space 50, the high-pressure compressor 28, the low-pressure compressor 26 and the bypass flow passage 54, into the flow passage 206. At least a portion of the air is routed to the cooling air inlet 214, of the cooling jacket 210 via the air extraction port 234, into the cooling flow passage 236 of the cooling jacket 210. In the alternative, at least a portion of the air is routed to the ring manifold 250 to be distributed to the respective cooling air inlets 214 of each of the plurality of cooling jackets 210. The air flows through each respective cooling flow passage 236 of each respective cooling jacket 210, across the outer surface 110 of each respective valve housing 108, thus cooling the respective valve housing 108 and reducing or preventing the potential formation of coke therein. In particular embodiments, a second portion of the air may be routed from the flow passage into the cooling air plenum 82 where it may be directed across the portion of the fuel injector 100 that is disposed within the engine casing 40 and within the combustor 30.

Further aspects are provided by the subject matter of the following clauses:

A fuel injector cooling system, comprising: a blower including a blower inlet and a blower outlet; a valve including a valve inlet and a valve outlet; a duct defining a flow passage between the blower outlet and the valve inlet; a fuel injector including a flange and a valve housing extending radially outward from the flange, wherein the valve housing defines an outer surface of the fuel injector; and a cooling jacket defining an inner surface and a cooling air inlet in fluid communication with the flow passage of the duct, wherein the cooling jacket at least partially surrounds the valve housing to define a cooling flow passage between the inner surface of the cooling jacket and the outer surface of the valve housing, wherein the cooling flow passage is in fluid communication with the flow passage.

The fuel injector cooling system of the preceding or any following clause, wherein the cooling jacket comprises a first shell body and a second shell body.

The fuel injector cooling system of any preceding or following clause, further comprising a mechanical fastener, wherein the mechanical fastener couples the first shell body to the second shell body.

The fuel injector cooling system of any preceding or following clause, wherein the cooling jacket defines a spacer extending between the inner surface of the cooling jacket and the outer surface of the valve housing.

The fuel injector cooling system of any preceding or following clause, further comprising a ring manifold in fluid communication with the flow passage and the cooling air inlet of the cooling jacket.

The fuel injector cooling system of any preceding or following clause, further comprising an air extraction port disposed along the duct between the blower outlet and the valve inlet, wherein the cooling air inlet is in fluid communication with the flow passage via the air extraction port.

The fuel injector cooling system of any preceding or following clause, wherein the fuel injector cooling system is integrated into a gas turbine engine, the fuel injector cooling system further comprising a check valve disposed downstream from the valve outlet, wherein the check valve is in fluid communication with a cooling air plenum of a gas turbine engine.

The fuel injector cooling system of any preceding or following clause, wherein fuel injector further comprises a fuel nozzle body, wherein the fuel nozzle body is in fluid communication with the cooling air plenum.

The fuel injector cooling system of any preceding or following clause, wherein the gas turbine engine includes an under-cowl space, wherein the blower inlet is in fluid communication with the under-cowl space.

The fuel injector cooling system of any preceding or following clause, wherein the valve housing of the fuel injector is configured to receive a first fuel valve and a second fuel valve.

A gas turbine engine, comprising: a core engine including, in serial flow order, a high-pressure compressor, a compressor discharge plenum, a combustor surrounded by an engine casing, and a plurality of fuel injectors, each respective fuel injector of the plurality of fuel injectors having a nozzle body disposed inside of the engine casing within the combustor and a valve housing disposed outside of the engine casing; and a fuel injector cooling system, comprising: a blower including a blower inlet and a blower outlet; a valve including a valve inlet and a valve outlet; a duct defining a flow passage between the blower outlet and the valve inlet; and a plurality of cooling jackets, each respective cooling jacket of the plurality of cooling jackets including an inner surface and a cooling air inlet in fluid communication with the flow passage, wherein each respective cooling jacket defines a cooling flow passage between the inner surface of the respective cooling jacket and the outer surface of the valve housing of the respective fuel injector of the plurality of fuel injectors.

The gas turbine engine of the preceding or any following clause, wherein each respective cooling jacket of the plurality of cooling jackets includes at least one spacer extending between the inner surface of the respective cooling jacket and the outer surface of the respective fuel injector.

The gas turbine engine of any preceding or any following clause, wherein at least one respective cooling jacket of the plurality of cooling jackets comprises a first shell body and a second shell body.

The gas turbine engine of any preceding or any following clause, further comprising a core cowl surrounding at least a portion of the engine casing, wherein an under-cowl space is defined between the engine casing and the core cowl, wherein the fuel injector cooling system is disposed within the under-cowl space.

The gas turbine engine of any preceding or any following clause, wherein the blower inlet is in fluid communication with the under-cowl space.

The gas turbine engine of any preceding or any following clause, further comprising a ring manifold extending circumferentially about the engine casing, wherein the ring manifold is in fluid communication with the flow passage and with the cooling air inlet of each respective cooling jacket of the plurality of cooling jackets.

The gas turbine engine of any preceding or any following clause, further comprising an air extraction port disposed along the duct between the blower outlet and the valve inlet, wherein the cooling air inlet of each respective cooling jacket of the plurality of cooling jackets is in fluid communication with the flow passage via the air extraction port.

The gas turbine engine of any preceding or any following clause, wherein the valve housing of at least one of the respective fuel injectors of the plurality of fuel injectors is configured to receive a first fuel valve and a second fuel valve.

The gas turbine engine of any preceding or any following clause, further comprising a cooling air plenum defined within the engine casing, wherein the fuel injector cooling system further comprises a check valve disposed downstream from the valve outlet, wherein the check valve is in fluid communication with the cooling air plenum.

The gas turbine engine of any preceding or any following clause, wherein each respective fuel injector of the plurality of fuel injectors includes a nozzle body in fluid communication with the cooling air plenum.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A fuel injector cooling system, comprising:
   a blower including a blower inlet and a blower outlet, wherein the blower inlet is in fluid communication with an under-cowl space of a gas turbine engine;
   a valve including a valve inlet and a valve outlet;
   a duct defining a flow passage between the blower outlet and the valve inlet;
   a fuel injector including a flange and a valve housing extending radially outward from the flange, wherein the valve housing has an outer surface; and a cooling jacket defining an inner surface and a cooling air inlet in fluid communication with the flow passage of the duct, wherein the cooling jacket comprises a first shell body and a second shell body, wherein the cooling jacket at least partially surrounds the valve housing to define a cooling flow passage between the inner surface of the cooling jacket and the outer surface of the valve housing, wherein the cooling flow passage is configured to guide air flow along the outer surface of the valve housing, wherein the cooling flow passage is in fluid communication with the flow passage, wherein the cooling jacket defines the cooling air inlet at a portion of the valve housing radially outward from the flange, and wherein the cooling flow passage defines a first cooling flow outlet at a portion of the valve housing beside the flange and a second cooling flow outlet disposed radially outward of the flange and beside a fuel inlet of the fuel injector.

2. The fuel injector cooling system of claim 1, wherein the first shell body includes a first plurality of spacers and the second shell body includes a second plurality of spacers, wherein the first plurality of spacers and the second plurality of spacers provide a gap between the outer surface of the valve housing and the inner surface of the cooling jacket, wherein the gap forms the cooling flow passage, and wherein the first plurality of spacers and the second plurality of spacers project radially inward to contact the valve housing.

3. The fuel injector cooling system of claim 2, further comprising a mechanical fastener that couples the first shell body to the second shell body.

4. The fuel injector cooling system of claim 1, further comprising a ring manifold in fluid communication with the flow passage and the cooling air inlet of the cooling jacket.

5. The fuel injector cooling system of claim 1, further comprising an air extraction port disposed along the duct between the blower outlet and the valve inlet, wherein the cooling air inlet is in fluid communication with the flow passage via the air extraction port.

6. The fuel injector cooling system of claim 1, wherein the fuel injector cooling system is integrated into the gas turbine engine, the fuel injector cooling system further comprising a check valve disposed downstream from the valve outlet, wherein the check valve is in fluid communication with a cooling air plenum of the gas turbine engine.

7. The fuel injector cooling system of claim 6, wherein the fuel injector further comprises a fuel nozzle body in fluid communication with the cooling air plenum.

8. The fuel injector cooling system of claim 1, wherein the valve housing of the fuel injector is configured to receive a first fuel valve and a second fuel valve.

9. A gas turbine engine, comprising:
   a core engine including, in serial flow order, a high-pressure compressor, a compressor discharge plenum, a combustor surrounded by an engine casing, and a plurality of fuel injectors, each respective fuel injector of the plurality of fuel injectors having a nozzle body disposed inside of the engine casing within the combustor and a valve housing disposed outside of the engine casing; and
   the fuel injector cooling system of claim 1.

* * * * *